(12) United States Patent
Liu et al.

(10) Patent No.: US 8,479,126 B1
(45) Date of Patent: Jul. 2, 2013

(54) PARAMETRIC YIELD IMPROVEMENT FLOW INCORPORATING SIGMA TO TARGET DISTANCE

(75) Inventors: Hongzhou Liu, Pittsburgh, PA (US); Hui Zhang, Pittsburgh, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 844 days.

(21) Appl. No.: 11/847,126

(22) Filed: Aug. 29, 2007

(51) Int. Cl.
*G06F 17/50* (2006.01)
*G06F 7/60* (2006.01)
*G06G 7/48* (2006.01)

(52) U.S. Cl.
USPC ............... 716/101; 716/106; 716/132; 703/2; 703/6; 703/14

(58) Field of Classification Search
USPC ........................................ 716/2; 703/2, 6, 14
See application file for complete search history.

(56) References Cited

U.S. PATENT DOCUMENTS 5,581,466 A * 12/1996 Van Wyk et al. ................ 700/95
2008/0195359 A1 * 8/2008 Barker et al. .................... 703/2

FOREIGN PATENT DOCUMENTS

WO 2007/005724 A 1/2007

OTHER PUBLICATIONS

European Search Report, Application No. EP 08 25 2875, Dated Feb. 23, 2009, 8 pages.

Sinhea et al., Statistical Timing Yield Optimization by Gate Sizing, IEEE Transactions on Very Large Scale Integration (VLSI) Systems, IEEE Service Center, Piscataway, NJ, vol. 14, No. 10, Oct. 1, 2006, pp. 1140-1146, XP011142367.
Sinhea et al., "Statistcal Gate Sizing for Timing Yield Optimization," Computer-Aided Design, 2005, ICCAD-2005, IEEE/ACM International Conference on Nov. 6-10, 2005, Piscataway, NJ, US, IEEE, pp. 1037-1042, XP010865141.
Datta et al., "Speed Binning Aware Design Methodology to Improve Profit Under Parameter Variations," Design Automation, 2006, Asia and South Pacific Conference on Jan. 24, 2006, Piscataway, NJ, USA, IEEE, pp. 712-714, XP010901157.
Antreich et al., "Circuit Analysis and Optimization Driven by Worst-Case Distances," IEEE Transactions on Computer Aided Design of Integrated Circuits and Systems, IEEE Service Center, Piscataway, NJ, US, vol. 13, No. 1, Jan. 1, 1994, pp. 57-71, XP000452166.
Antreich et al., "WiCkeD: Analog Circuit Synthesis Incorporating Mismatch," Proceedings of the IEEE 2000 Custom Integrated Circuits Conference (Cat. No. 00CH37044) IEEE Piscataway, NJ, US, 2000, pp. 511-514, XP002514256.

(Continued)

*Primary Examiner* — Helen Rossoshek
(74) *Attorney, Agent, or Firm* — Schwegman Lundberg & Woessner, P.A.

(57) ABSTRACT

Techniques are presented for improving parametric yield. As part of an automatic sizing process for a circuit, one set of techniques receives a target value for a performance goal and then optimizes, with respect to the number of standard deviations, the distance by which the mean value of a distribution of the performance goal differs from the target value. In a second set of techniques, as part of an automatic sizing process during a circuit design process, the operation of the circuit is simulated to determine the distribution of a performance goal for a first design point. It is then determined whether a second design point is sufficiently close to the first design point and, if so, the simulation for the first design point is used for evaluating the second design point in an optimization process.

22 Claims, 5 Drawing Sheets

OTHER PUBLICATIONS

Datta et al., A Statistical Approach to Area-Constrained Yield Enhancement for Pipelined Circuits under Parameter Variations, Test Symposium, 2005, Proceedings, $14^{th}$ Asian Calcutta, India Dec. 18-21, 2005, Piscataway, NJ, US, pp. 170-175, XP010877916.

Rappitsch et al., "Experimental Verification of Simulation Based Yield Optimization for Power-On Reset Cells," Conference 2006, IEEE Custom Integrated Circuits, IEEE, Piscataway, NJ, US, Sep. 1, 2006, pp. 857-860, XP031052599.

"European Application Serial No. 08252875.3, Office Action mailed Nov. 3, 2009", 1 pg.

"European Application Serial No. 08252875.3, Response filed May 12, 2010 to Office Action mailed Nov. 3, 2009", 16 pgs.

"European Application Serial No. 08252875.3, Search Report mailed Mar. 23, 2009", 10 pgs.

Antreich, Kurt, et al., "WiCkeD: analog circuit synthesis incorporating mismatch", Proceedings of the IEEE 2000 Custom Integrated Circuits Conference, 2000. CICC., (2000), 511-514.

\* cited by examiner

PARAMETRIC YIELD IMPROVEMENT FLOW INCORPORATING SIGMA TO TARGET DISTANCE

BACKGROUND

This application relates generally to integrated circuit design and simulation and, more particularly, to the use of parametric yield information during analog circuit automatic optimization processes.

Figure 1A:
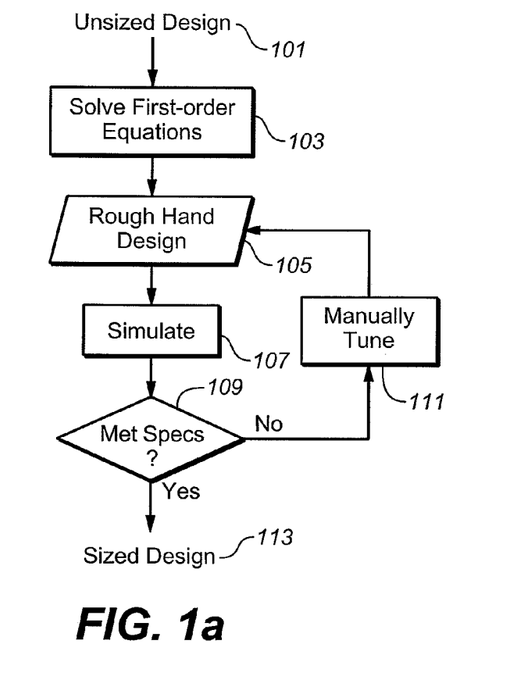
FIG. 1 illustrates manual and automated circuit sizing.

Circuit design requires several steps including topology selection, sizing and layout. Topology selection is the task of choosing an interconnection of circuit components and devices to implement a desired function. To size a circuit, current methodologies use simple handcrafted equations and various heuristics to guess at initial values for device sizes. A typical process is shown in FIG. 1a: Beginning with an unsized design at 101, a set of first order equations are solved (103) and a rough design is done by hand (105). Simulation (107) is invoked and device sizes are "tweaked" (111) to rectify the simple, first-order handcrafted equations with more precise simulation until the specifications are met (109), resulting in a sized design (113).

Figure 1B:
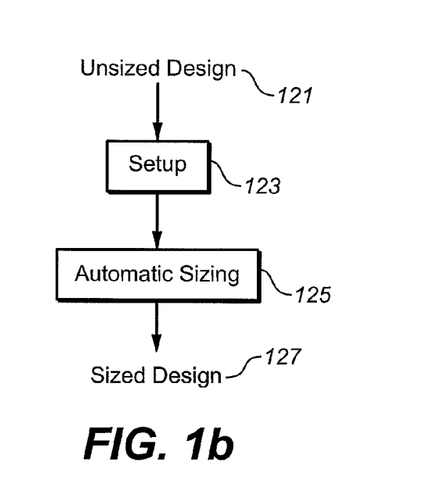

Circuit synthesis replaces this manual, designer-in-the-loop process with automated sizing shown in FIG. 1b: After taking the unsized design (121) and performing the initial setup (123), an automatic sizing process (125) yields a sized design (127). The simulation environment used in the manual design process is typically a SPICE-type simulation. Examples of commercially available SPICE simulators include the Spectre simulator from Cadence, the Eldo simulator from Mentor Graphics and the HSPICE simulator from Synopsys. Once a circuit has been sized it proceeds to the next step in the design process, layout.

During the fabrication process of integrated circuit, because of physical processing, imperfections in the properties of devices may vary from one to other. This causes measured circuit performance to differ from the results from circuit simulation, causes yield problems. This problem is considered in the idea of Design For Yield (DFY), which is now discussed.

The ratio of number of chips that meet specifications in certain conditions to the total number of chips that are manufactured is defined as yield. There are two types of yield: One is functional yield or catastrophic yield, which measures the percentage of chips having functionality. The other is parametric yield, which measures the percentage of chips meeting all specifications. To maximize the parametric yield of a chip, two types of effects should be considered. One is environmental effects, which includes temperature changes, power supply changes, etc. The other is manufacture-related effects, also called physical process variations. The method to design a robust circuit with respect to environmental changes and process variations is called design for yield or design for parametric yield.

Physical process variations are caused by processing and mask imperfection. Normally these are modeled as two different types of statistical variations in the circuit device model: Global, or inter-die, variation and local variation, mismatch variation or intra-die variation. Design for yield (DFY) has become more and more important in modern technology for high performance analog circuit design because variations in device properties, especially mismatch effects, increase within the shrinking of typical device size. Designing analog circuit or migrating design to 90 nm or newer technology processes will need more design effort to achieve high yield design. There exist various methods to optimize analog circuit yield considering environmental and physical variation, including Worst-Case Corner, Monte Carlo Simulation, Response Surface Model, and Worst Case Distance methods.

Traditional worst-case methods are limited for several reasons. First, unlike most digital circuits, the typical analog circuit has many varied performance specifications and requires a richer set of simulations to qualify. The simple "Fast" device and "Slow" device worst-case corner methods are generally not adequate for analog circuits. Second, within-die variations (mismatch variations) are becoming more important than die-to-die variations (global process variations) for high performance analog circuits in deep-submicron technologies. The number of worst-case corners increases exponentially with the number of parameters that are varied. To consider mismatch effects, simply enumerating and simulating worst-case corners quickly becomes intractable. Furthermore, the so called worst-case corner method does not typically consider the distribution information of parameters and possible correlation between them, and consequently, circuits using this design method often turn out to be either over-designed or under-designed.

The Monte Carlo method is a reliable and popular method used to estimate yield; however, few applications use Monte Carlo results in a systematic way to generate statistical corners or in a well-defined methodology to maximize yield. In other words, the Monte Carlo method is primarily used as a verification step rather than as an integral part of the design process.

Response Surface Models (RSM) can be built for both design variables and statistical variables to help accelerate yield estimation and as part of a methodology to maximize yield. Building RSM processes includes Model Training, Model Selection, and Model Testing process. Model Training is the process to adjust model parameters to minimize model training error. Model selection is the process to selection right model structure and complexity. Model testing is the process to evaluate the quality of the model.

RSM can have high accuracy in low dimensional and weak nonlinear design spaces. The yield estimation process can be accelerated by running Monte Carlo simulations on RSM. Applying direction optimization techniques on some forms of RSM can make design for yield processes easier; for examples, quadratic optimization can be used to quickly find the optimum of quadratic forms in RSM. However, as most analog design spaces are very nonlinear, it is difficult to use Design of Experiment to screen statistical and design variables, as this causes the number of samples needed to build RSM rapidly becomes intractable as the number of variables increase. Also, the error inherent in any RSM is another drawback to this approach, as this error will make yield estimations inaccurate and often fail to find high yield circuit design.

The Worst Case Distance method can be illustrated as follows: assume a linear relation between performance, f, and a statistical variable, s, and assume a Gaussian distribution for the statistical variable s. For performance function, f(s), the performance specification is U. First the performance variance is calculated, then the Worst Case Distance, $\beta W$, is calculated. The yield can be estimated by using the Worst Case Distance $\beta W$ for each performance. Finally the Worst Case parameter and tolerance class can be derived. For nonlinear circuit performance, sensitivity analysis can be use for each performance and it will iterate the Worst Case Distance process until it converges. Worst Case Distance method is easy to implement and fast for yield estimation and optimization. However, sensitivity analysis has limitations for the nonlinear performance functions. Further, although this method is efficient for linear or nearly linear performance functions with a small number of statistical variables, it quickly becomes less efficient for nonlinear performance specifications or for designs with a large number of parameters.

Consequently, although there are some known methods for design for yield, there remains room for improvement, particularly for use in analog circuits and when there are nonlinear characteristics, large numbers of parameters, or both.

SUMMARY

A first set of embodiments presents methods, along with a corresponding system and a computer program product, for use in a circuit design process. As part of an automatic sizing process for a circuit, the technique receives a target value for a performance goal and then optimizes, with respect to the number of standard deviations, the distance by which the mean value of a distribution of the performance goal differs from the target value.

In a second set of embodiments, as part of an automatic sizing process during a circuit design process, the operation of the circuit is simulated to determine the distribution of a performance goal for a first design point. It is then determined whether a second design point is sufficiently close to the first design point and, if so, the simulation for the first design point is used for evaluating the second design point in an optimization process.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION OF EXEMPLARY EMBODIMENTS

Overview

It is well known that integrated circuit (IC) yield is directly related to product profitability, and that increasing yield by even a few percentage points may add millions of dollars to the bottom line. All IC manufacturing processes have inherent variations that act to alter the performance specifications of a design from one die to the next. Because a product's yield is simply the percentage of manufactured designs that pass all performance specifications, one method used by designers to maximize yield is to design a circuit that is as robust as possible in the face of manufacturing variations. This is known as designing for yield or designing to maximize parametric yield.

The following presents novel techniques to help design for parametric yield flow by incorporating parametric yield information during analog circuit automatic optimization processes. During an analog circuit design flow, a circuit sizing procedure finds an analog circuit with a defined size value to meet specifications. This procedure can be accomplished by using analog circuit optimization tools, such NeoCircuit or ADE-GXL. By using the techniques presented here, analog circuit optimize tools can optimize circuit to meet nominal specs and achieve high yield in one-pass process. More specifically, the described techniques provide the two following advancements:

1) Optimize for performance sigma-to-target distance instead of specification; and 2) Performance goal sigma estimation and sharing during optimizing process.

More detail on some of the various aspects of circuit simulation that can used with the techniques described here are presented, for example, in "Generation of Correlated Parameters for Statistical Circuit Simulation", by K. S. Eshbaugh, in *IEEE Transactions on Computer Aided Design of Integrated Circuits and Systems,* 1992, Vol. 11; No. 10, page 1198, or various user manuals. More specific detail on design for yield in analog circuit design can be found in U.S. patent application Ser. No. 11/361,928, entitled "Method and System for Improving Yield of an Integrated Circuit", filed on Feb. 23, 2006, to which specific reference is made; for example, embodiments of the techniques presented here can be implemented as a circuit optimizer using a computer system or as a computer program product, such as those described therein. Reference is also made to U.S. Pat. Nos. 6,618,837; 7,177,783; and 7,219,045.

Figure 2:
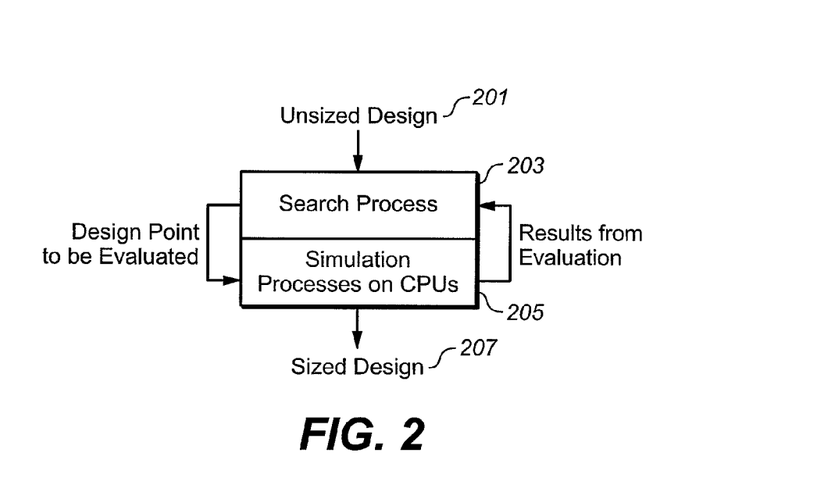
FIG. 2 illustrates an automatic sizing process.
Figure 3:
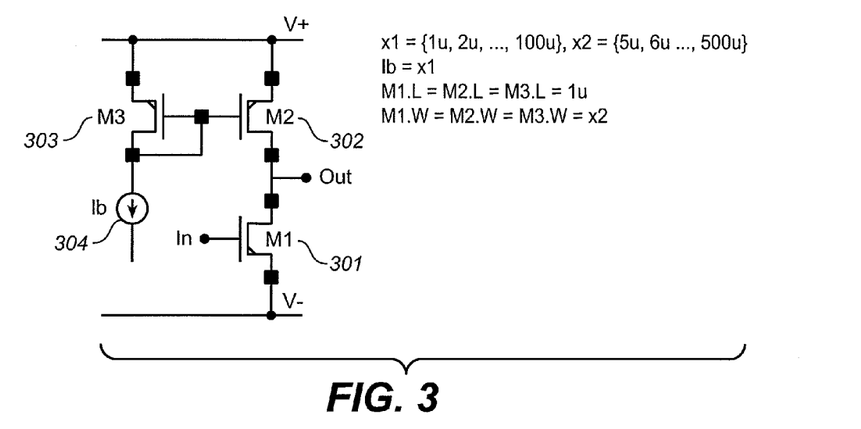
FIG. 3 is an example to explain design points and design spaces.

As discussed in the background section above, circuit design requires several steps, including sizing. The sizing technology is preferably an optimization-based system that uses numerical techniques to search a defined design space. Such an automatic sizing process is shown schematically in FIG. 2. Beginning at 201 with an unsized design, a search process is performed (203), which then supplies a given design point for simulation processes on CPUs at 205, which in turn provides the results for the evaluation back to the search process (203), resulting in the sized design at 207. A design space is typically composed of many design points, where a design point is a particular set of component sizes for a circuit, such as is shown in FIG. 3. Although the following discussion is based on such an automatic sizing process, the use of the sigma-to-target techniques presented here are more generally applicable to other processes in circuit design or optimization that are subject to similar variations; for example, they can be employed during verification.

FIG. 3 is a simple example to explain design points and design spaces. The simple circuit has the transistors M1 301, M2 302, and M3 303 and a current source Ib 304 connected as shown. Also, for simplicity the example assumes that the transistors have only two parameters of interest: width, W, and length, L, where these are specified as:

$x1=\{1u,2u,\ldots,100u\}, x2=\{5u,6u,\ldots,500u\}$ $Ib=x1$ $M1\cdot L=M2\cdot L=M3\cdot L=1u$ $M1\cdot W=M2\cdot W=M3\cdot W=x2$, where 1u is a micron ($1\times10^{-6}$ m). This example has two independent variables, x1, x2. A design point is a particular value for x1 and x2. Examples of design points are {1u,5u}, {10u, 10u}, {100u, 500u}, and so on. The search process (203, FIG. 2) iteratively sets x1 and x2 then evaluates the performance goals for a particular design point. The design space is then the set of all design points, in this example:

$\{x1,x2\}=\{\{1u,5u\},\{1u,6u\},\ldots,\{1u,500u\}$,

...

$\{2u,5u\},\{2u,6u\},\ldots,\{2u,500u\}$, $\{100u,5u\},\{100u,6u\},\ldots,\{100u,500u\}\}$ The design variable space can be predefined for the automatic sizing process. In the automated sizing process, the points with design variable values will be generated. A user may set limits or specific ranges for design variables, as well as supplying performance goals, with the set of points then determined internally, although the user also has the option of setting values by hand and tweaking the design if desired.

Unlike the simple example in FIG. 3, design spaces for industrial circuits may contain trillions of design points or more. This means that the design space cannot be effectively explored using an exhaustive search to evaluate each design point, as the cost of running Monte Carlo simulation on all points is too costly. Consequently, an intelligent search process is typically necessary to find a point that meets the user specified performance metrics and is optimal in terms of area, power, and/or other measure of merits.

Figure 4:
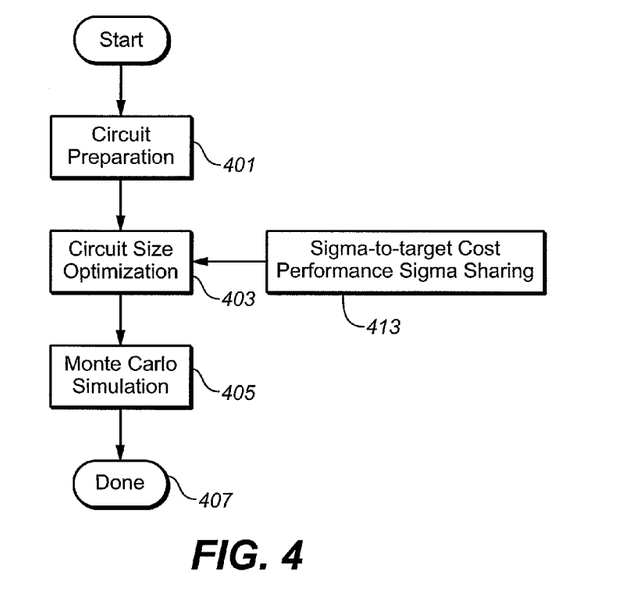
FIG. 4 is a sigma-optimization-based yield flow.

FIG. 4 shows an overview of a suggested sigma optimization based yield flow. A first act is circuit preparation (401), after which circuit optimization tools are run (403), incorporating (413) the sigma-to-target cost and performance sigma sharing techniques developed below. After circuit optimization finished, Monte Carlo simulation (405) is run to verify circuit final parametric yield (407).

The formulation presented here can be incorporated into the same simulation environment as used in the manual design process, typically SPICE simulation. Examples of commercially available SPICE simulators include the Spectre simulator from Cadence, the Eldo simulator from Mentor Graphics and the HSPICE simulator from Synopsys.

Optimizing for Performance Sigma-to-Target Distance

This section presents the concept of optimizing performance based on sigma-to-target distance, rather than just the specification. Many performance goals are normally distributed in Monte Carlo Simulation. If the performance goals are not normally distributed, they can be transformed to a Gaussian, or normal, distribution. A normally-distributed goal can be characterized by its mean and standard deviation, $(\mu,\sigma)$. Sigma-to-target (stt) is the distance of the mean from the target expressed in terms of the number of standard deviations and can represented as $(stt)=(\mu-\text{target})/\sigma$.

The yield for a given sigma-to-target can then be calculated as $$\text{yield} = 0.5 + 0.5 * \text{erf}\left(\frac{stt}{\sqrt{2}}\right),$$

where erf is the error function. The user can supply the target values. Example of performance goals could include, say, gain with a corresponding target value of $\geqq 60$ dB or power with a corresponding goal of $\leqq 100$ mW. (To specify a range for a target value, an upper limit and a lower limit are typically specified as two goals.)

Figure 5:
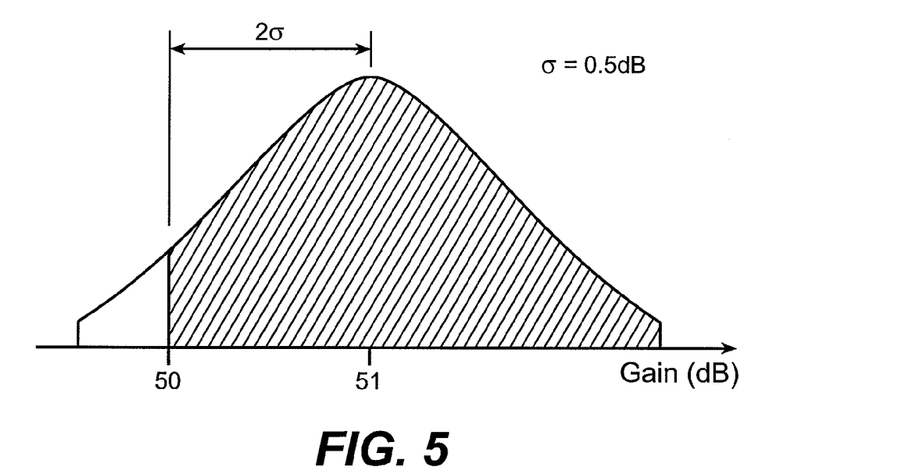
FIG. 5 illustrates the sigma-to-target concept.

FIG. 5 can be used to illustrate some of these concepts. FIG. 5 shows a normally distributed goal, here the gain. The distribution (where the tails are cut off) has a mean of $\mu=51$ dB and a standard deviation of $\sigma=0.5$ dB. The target is 50 dB. Consequently, $2\sigma$ less than the mean $\mu$ will correspond to a gain of 50 dB, so that all points not more than $2\sigma$ less than the mean (the more lightly shaded region) will meet the goal.

Sigma-to-target can be a better way to estimate high yield for a circuit; for example, the following sigma-to-target values correspond to the respective yield values:

$1\sigma\rightarrow84.13\%\ 2\sigma\rightarrow97.72\%\ 3\sigma\rightarrow99.87\%\ 6\sigma\rightarrow99.999999\%$.

Figure 6:
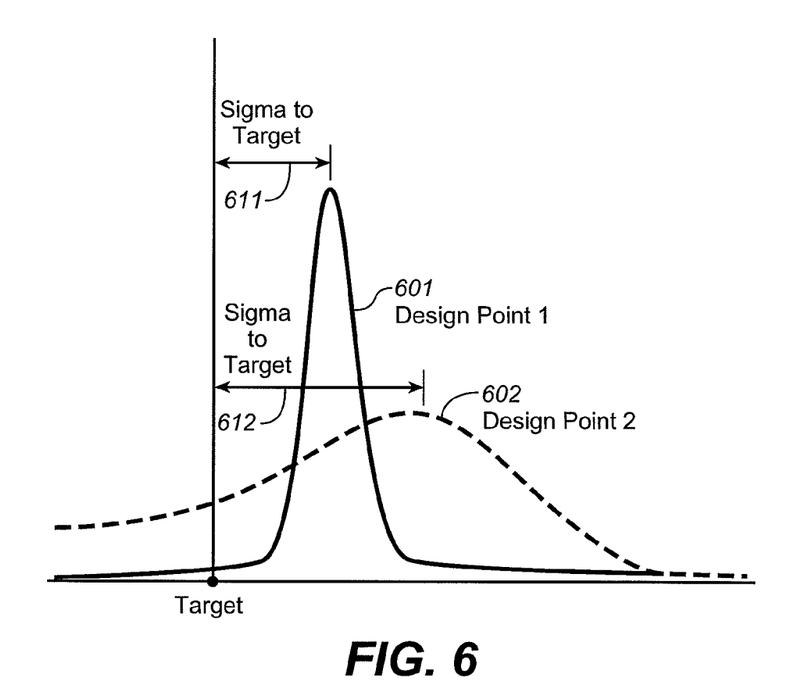
FIG. 6 shows a comparison between normal performance and yield estimate for two different distributions.

Most of current circuit optimization algorithm optimizes circuit to meet predefined specifications. That means it tries to maximize performance goal value as far as possible based on a predefined target; however, better performance goal values do not necessarily mean better yield, as the yield is dependent on the performance goal distribution generated from Monte Carlo simulation. FIG. 6 shows performance goal for two different design point distributions and illustrates that better performance does not necessarily correspond to higher yield from Monte Carlo results.

In FIG. 6, the design target is shown as the line on the left and two distributions 601, for design point 1, and 602, for design point 2, their respective sigma-to-target distances 611 and 612. The distribution 601 for design point 1 has a mean fairly close to the target value, but as it is quite peaked, corresponding to a very small $\sigma$ value. Consequently, even though the mean to target distance ($\mu$-target) 611 is small, as $\sigma$ is very small, the target will be several standard deviations away from the mean; therefore the ratio ($\mu$-target)/$\sigma$ is large, and therefore the yield will be high. Design point 2 has distribution 602 and has a mean further away from the target, as shown at 612; however, as the distribution is very flat, its standard distribution is relatively quick large. Thus, even though ($\mu$-target) for 612 is larger (corresponding to better normal performance) than for design point 1, ($\mu$-target)/$\sigma$ will be smaller (resulting in lower yield). So, when evaluating these two distributions, although design point 1 has worse normal performance, it will have higher yield.

During an analog circuit optimization process, each visited design point will be simulated by circuit simulation tools. The performance goals will be evaluated from simulation results. A "cost" value will be calculated based on these performance goals values. The "cost" for each design point represents quality of the point. In the normal analog circuit optimization, the cost is calculated from performance value distance to target, vtt. The techniques presented here instead, or in addition, use the sigma-to-target distance stt.

Figure 7:
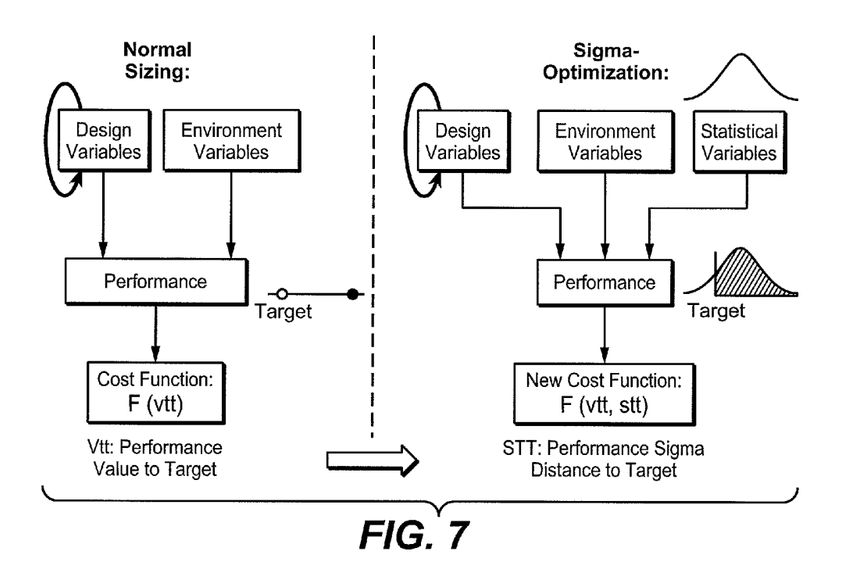
FIG. 7 illustrates cost function formulation for normal optimization and cost function formulation incorporating sigma-optimization.

Sigma-Optimization method uses the sigma distance to target (that is, the mean to target distance in terms of the standard deviation) to construct the cost function, therefore directly guiding optimization searching by circuit yield. The final point from searching results will have both good normal performance and high yield estimate. This distinction between cost function formulation for normal optimization and cost function formulation incorporating sigma optimization is illustrated schematically in FIG. 7. Unlike a multiple iteration process to improve yield, sigma-optimization based improve yield flow is one iteration process. As shown in FIG. 7, one preferred embodiment of the const function uses vtt and stt.

Figure 8:
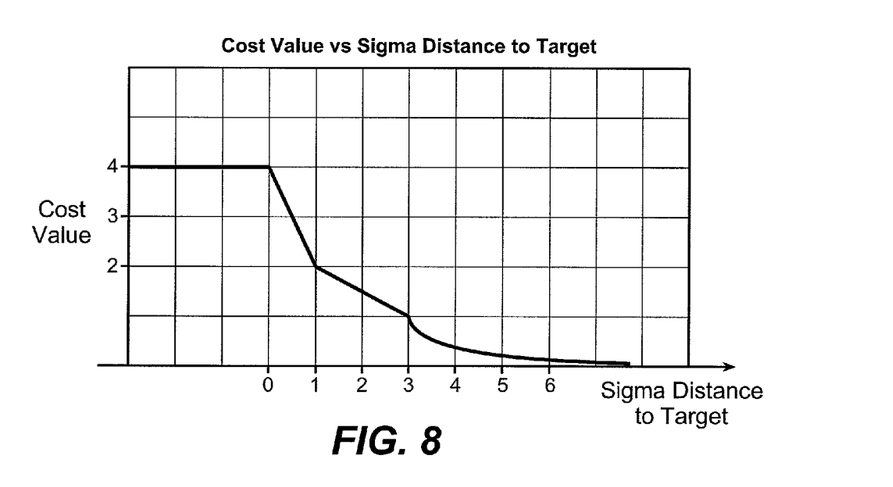
FIG. 8 shows an example of the dependence the cost function on the sigma distance to target.

An example of how the functional form of the cost function depends on the sigma to target distance is shown in FIG. 8. As shown in this example of how to map the sigma distance to target value (stt) to cost value (F), as sigma distance to target increases, the cost value F(vtt,stt) decreases.

Performance Goal Sigma Estimation and Sharing During Optimizing Processes

This section presents the concepts of performance goal sigma estimation and sharing during optimizing processes. To obtain the sigma distance to target for a design point during the improved yield process described in the preceding section, the performance goal distribution standard deviation ($\sigma$) will be calculated using, in the exemplary embodiment, Monte Carlo simulation; however, it can be very time consuming to run a Monte Carlo simulation for each design point. The whole improved yield process will typically visit thousands of design points, resulting in the whole flow requiring a very long running time if Monte Carlo simulation is run for each design point.

The techniques of the present section uses a method that allows many design points to share a single Monte Carlo simulation. It is assumed that the design variable space is relatively smooth, so that the performance goal distribution near neighbor points changes little. The detailed flow of how to calculate the neighbor points in the design space considering performance is outlined in FIG. 9.

Figure 9:
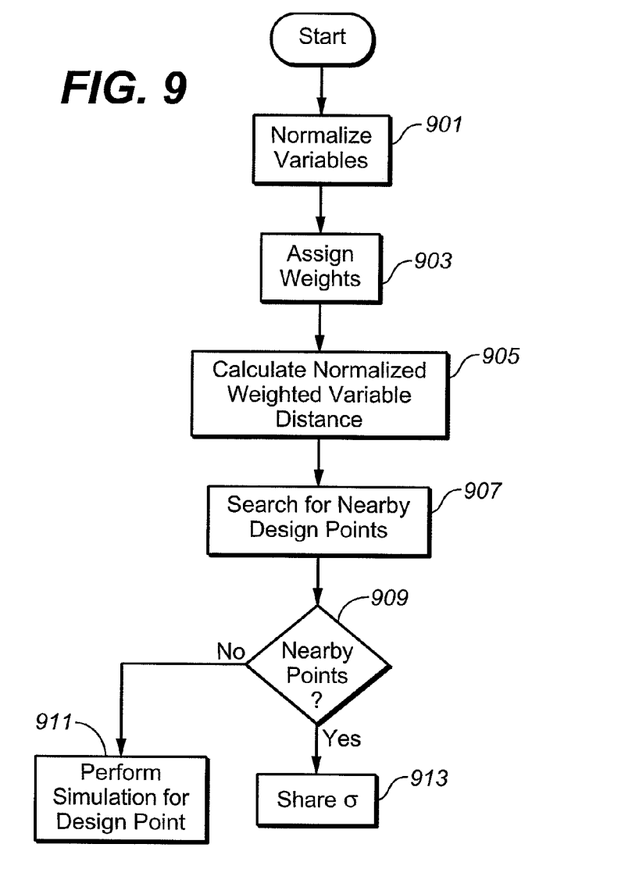
FIG. 9 presents a flow outlining how to calculate the neighbor points in the design space considering performance.

FIG. 9 begins with Normalizing the different design variables into the same range at 901; for example:

Norm_var=(var−mean_var)/(max_var−min_var).

During optimization, the process keeps track of the impact of the various design variables. At 903, each design variable is assigned a weight, which represents how much the design variable affects the total design performance. The normalized weighted variable distance is then calculated at 905; for example:

Norm Weight Distance(point1,point2)=

$SQRT$(weight_var1*Norm_var1*Norm_var1+ weight_var2*Norm_var2*Norm_var2).

For each new design point the algorithm visits, 907 searches whether there is a "nearby" design point whose Monte Carlo simulation is finished. The criteria of "nearby" can be, for example, to calculate the normalized weighted variable distance and check whether it is in the predefined range (909). In one set of embodiments, the judgment can be dynamic, where the results for an initially set value can checked and adjusted one or more times as needed during the run based on the amount of resulting change.

Figure 10:
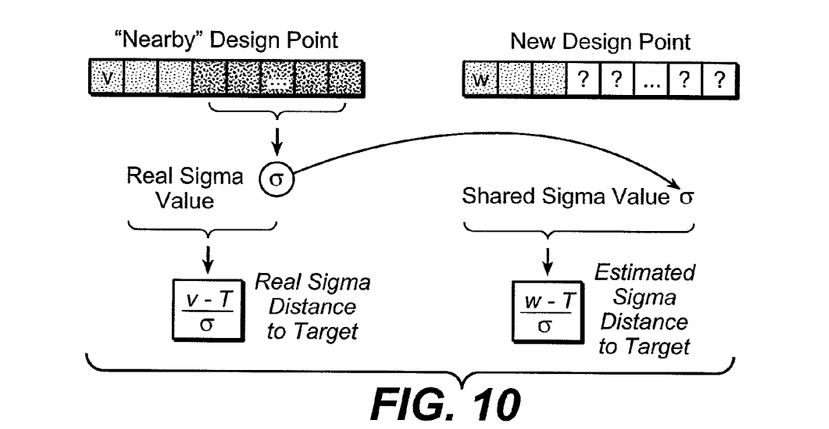
FIG. 10 schematically illustrates the sharing of sigma values.

If there is no "nearby" design point with a finished Monte Carlo simulation, a Monte Carlo simulation is performed for this design point (911). If there is a "nearby" design point with finished Monte Carlo simulation, the design point can share the same sigma value with the "nearby" design point (913). The concept of sharing sigma values is illustrated in FIG. 10. As shown there, for the new design point, only the mean (w) will need to be determined, with the new design point sharing the value of a with the nearby design point with mean value v, saving on the multiple simulation that would otherwise be needed to accurately determine the sigma distance to target of the new design point.

The application of the sigma sharing techniques shown in FIGS. 9 and 10 can result in significant time saving from algorithm. Let t1 be the normal simulation time for each design point and t2 be the time needed for the corresponding Monte Carlo simulation for each design point. The original algorithm run time for N design point is about:

$N*(t1+t2)$.

By incorporating the sigma technique, the run time is instead about:

$N*(t1+\text{share\_ratio}*t2)$

Based upon experimental results from a number of typical simulations, t2 is usually at least 10 times longer than t1 and the share_ratio can be smaller than 0.1. Based on these numbers, without sharing run time≈11*N*t1; with sharing, run time≈2*N*t1. This is an improvement in run time bay a factor of over five.

More generally, rather than the basic sharing technique just described, the sigma value for a given design point can be obtained from one or more "nearby" design points by extrapolation or interpolation; for example, the sigma for the given design point can be obtained by a, say, linear interpolation or extrapolation from two or more nearby points. Even based on a single nearby point, modeling or prediction can used to obtain a more accurate sigma value than a simple sharing of values.

COMMENTS AND CONCLUSION

As described above, the various embodiments presented here described two techniques that can be incorporated in design for yield processes. The first of these is to optimize for performance sigma-to-target distance instead of optimizing for specification. The second is to estimate and share performance goal sigmas during the optimizing process. Applying these techniques can add yield improvement functionality to any existing analog circuit optimization algorithm.

Although the various aspects of the present invention have been described with respect to exemplary embodiments thereof, it will be understood that the present invention is entitled to protection within the full scope of the appended claims.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

It is claimed:

1. A method for optimizing a circuit design, the method comprising:
   receiving a circuit performance target value for the circuit design;
   simulating operation of a circuit corresponding to the circuit design, the simulating using one or more design points corresponding to at least a size of a particular circuit component in the circuit design;
   receiving a circuit performance result that includes information from the simulated operation of the circuit design using the one or more design points;
   determining a mean value of a distribution of the circuit performance result; and
   optimizing a difference between the mean value of the distribution of the circuit performance result and the circuit performance target value with respect to a number of standard deviations of the distribution of the circuit performance result, the optimizing including adjusting at least the size of the particular circuit component in the circuit design;
   wherein all steps are implemented using a processor unit.

2. The method of claim 1, further comprising:
   subsequent to said optimizing, verifying a parametric yield for the circuit.

3. The method of claim 2, wherein the verifying is performed using Monte Carlo simulation.

4. The method of claim 1, wherein the simulating operation of the circuit includes using a plurality of design points, and wherein receiving the circuit performance result includes receiving information from the simulated operation of the circuit using the plurality of design points.

5. The method of claim 4, wherein the optimizing includes determining the mean and standard deviation of the distribution of the circuit performance result.

6. The method of claim 4, where the distribution of the circuit performance result is obtained using Monte Carlo simulation.

7. The method of claim 1, wherein said optimizing is based on a cost function dependent on the distance by which the mean value of the distribution differs from the target value in terms of the number of standard deviations.

8. The method of claim 1, wherein the circuit performance result and target value are user supplied.

9. The method of claim 1, wherein the circuit performance result is a gain.

10. The method of claim 1, wherein the circuit performance result is a power usage.

11. A computer program product for a circuit design process, including a non-transitory computer-readable storage medium storing executable program code which, when executed by a computer, performs a method comprising:
   receiving a circuit performance target value for a circuit design;
   simulating operation of a circuit corresponding to the circuit design, the simulating using one or more design points corresponding to at least a size of a particular circuit component in the circuit design;
   receiving a circuit performance result that includes information about the simulated operation of the circuit design using the one or more design points;
   determining a mean value of a distribution of the circuit performance result; and
   optimizing a difference between the mean value and the circuit performance target value with respect to a number of standard deviations of the distribution of the circuit performance result, the optimizing including adjusting at least the size of the particular circuit component in the circuit design.

12. In a circuit design process, a method comprising:
   performing an automatic sizing process to find a size value for a circuit to meet a specification, including:
   simulating the operation of the circuit to determine a distribution of a circuit performance result for a first design point;
   determining whether a second design point is within a predefined distance from the first design point; and
   in response to determining that the second design point is within the predefined distance from the first design point, using the simulation for the first design point for evaluating the second design point in an optimization process;
   wherein all steps are implemented using a processor unit.

13. The method of claim 12, wherein the second design point is evaluated with respect to the number of standard deviations for the distribution for the first design point the distance by which the mean value of the second design point differs from a target value.

14. The method of claim 12, wherein the automatic sizing process further includes:
   in response to determining that the second design point is not within the predefined distance from the first design point, simulating the operation of the circuit to determine the distribution of a second circuit performance result for the second design point; and
   using the simulation for the second design point for evaluating the second design point in the optimization process.

15. The method of claim 12, wherein said simulating the operation of the circuit is performed using a Monte Carlo method.

16. The method of claim 12, wherein using the simulation for the first design point for evaluating the second design point in said optimization process includes using the standard deviation of the distribution of the performance goal for the first design point for evaluating the second design point in said optimization process.

17. The method of claim 12, wherein using the simulation for the first design point for evaluating the second design point in said optimization process includes modeling the standard deviation of a distribution of the performance goal for the second design point using the distribution of the circuit performance result for the first design point for use in evaluating the second design point in said optimization process.

18. The method of claim 12, wherein the automatic sizing process further includes:
- simulating the operation of the circuit to determine a distribution of a circuit performance result for one or more additional first design points,
- wherein using the simulation for the first design point for evaluating the second design point in said optimization process includes extrapolating and/or interpolating the standard deviation of a distribution of the circuit performance result for the second design point from the standard deviations of the distributions of the circuit performance result for the first design point and one or more of the additional first design point for use in evaluating the second design point in said optimization process.

19. The method of claim 12, wherein a criterion for determining whether the second design point is within the predefined distance from the first design point is dynamically determined as part of the automatic sizing process.

20. A computer program product for a circuit design process, including a non-transitory computer-readable storage medium storing executable program code which, when executed by a computer, performs a method comprising performing an automatic sizing process to find a size value for a circuit to meet a specification, including: simulating the operation of the circuit to determine a distribution of a circuit performance result for a first design point; determining whether a second design point is within a predefined distance from the first design point; and in response to determining that the second design point is within the predefined distance from the first design point, using the simulation for the first design point for evaluating the second design point in an optimization process.

21. A system for a design process of an integrated circuit, comprising:
- a user interface for viewing representations of the integrated circuit on a display; and
- at least one processing unit including circuitry to perform an automatic sizing process to find a size value for the integrated circuit to meet a specification, including simulating the operation of the circuit to determine a distribution of a circuit performance result for a first design point; determining whether a second design point is within a predefined distance from the first design point; and in response to determining that the second design point is within the predefined distance from the first design point, using the simulation for the first design point to evaluate the second design point in an optimization process.

22. A system for a design process of an integrated circuit, comprising:
- a user interface for viewing representations of the integrated circuit on a display; and
- at least one processing unit including circuitry to perform a circuit design process, including a method comprising:
- receiving a circuit performance target value for a circuit design;
- simulating operation of a circuit corresponding to the circuit design, the simulating using one or more design points corresponding to at least a size of a particular circuit component in the circuit design;
- receiving a circuit performance result that includes information about the simulated operation of the circuit design using the one or more design points;
- determining a mean value of a distribution of the circuit performance result; and
- optimizing a difference between the mean value and the circuit performance target value with respect to a number of standard deviations of the distribution of the circuit performance result, the optimizing including adjusting at least the size of the particular circuit component in the circuit design;
- wherein all steps are implemented using a processor unit.

* * * * *